3,083,200
22-HALO-20-SPIROX-4-ENE-3,21-DIONES AND
PROCESS FOR PREPARATION
Arthur A. Patchett, Metuchen, and Frederick F. Giarrusso, Elizabeth, N.J., assignors to Merck & Co., Inc., Rahway, N.J., a corporation of New Jersey
No Drawing. Filed June 27, 1960, Ser. No. 38,710
5 Claims. (Cl. 260—239.57)

This invention is concerned generally with novel steroids and processes of preparing the same. More particularly, it relates to novel 22-halogen-20-spirox-4-ene-3,21-diones, to the 7α-alkanoylthio-derivatives thereof, and to closely related compounds, which steroids possess useful therapeutic properties as aldosterone inhibitors. This invention also relates to pharmaceutical compositions containing these novel steroid compounds.

The name "20-spiroxane" is used to designate compounds having the following ring structure:

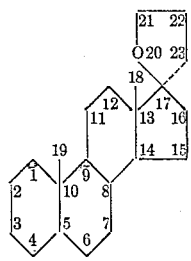

The novel "22-halogen-20-spirox-4-ene-3,21-diones" which form the subject of the present invention accordingly are compounds having the following structural formula:

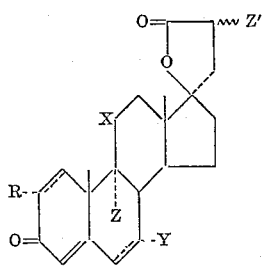

wherein the dotted lines between carbons 1-2 and 6-7 indicate that a double bond may be present in these positions, and wherein R refers to hydrogen or methyl, X refers to hydrogen or a keto or hydroxy substituent, Y refers to hydrogen or a lower alkanoylthio radical, Z refers to hydrogen or halogen, and Z' refers to a halogen atom. This invention also contemplates the lower alkyl, cyclohexyl and benzyl 3-enol ethers of compounds having the above structure. Among the radicals comprehended by the expression "lower alkanoyl" are formyl, acetyl, propionyl, butyryl, valeryl, hexanoyl, heptanoyl, octanoyl and branched-chain isomers thereof, said alkanoyl radicals being the acyl radicals of alkanoic acids containing fewer than nine carbon atoms.

These novel steroids block the salt-retaining effects of aldosterone and other salt-retaining steroids so as to be useful in the treatment of diseases such as congestive heart failure, nephrosis and cirrhosis of the kidney in which aldosterone secretion is increased.

In preparing our novel chemical compounds, the starting material utilized is a 20-spirox-4-ene-3,21-dione which may be identified by the following structural formula:

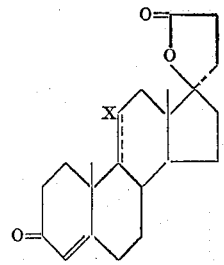

wherein the dotted line between carbon atoms 9 and 11 indicate that a double bond may be present in this position, and wherein X refers to hydrogen or an hydroxy substituent. However, it is clear to those skilled in the art that starting materials having other substituents in the above ring may be similarly converted to the desired end products.

In a specific embodiment of our invention, 20-spirox-4-ene-3,21-dione is converted into 3-ethylenedioxy-20-spirox-5-ene-21-one, which has the structure given below, for example, by exchange dioxolanation using butanone dioxolane in the presence of an acid catalyst such as p-toluenesulfonic acid.

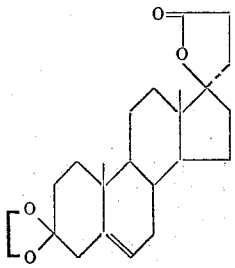

Upon treatment of 3-ethylenedioxy-20-spirox-5-ene-21-one with an oxalate ester and a non-aqueous strong base, such as sodium hydride, there is formed 3-ethylenedioxy-22-methoxalyl-20-spirox-5-ene-21-one, which has the following structure:

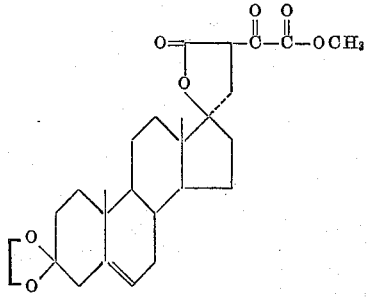

The 3-ethylenedioxy-22-fluoro-20-spirox-5-ene-21-one, which has the following structure:

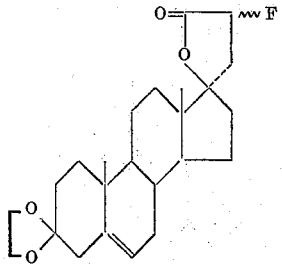

is prepared by contacting 3-ethylenedioxy-22-methoxalyl-20-spirox-5-ene-21-one with an alkali metal alkoxide to form the enolate, which on reaction with perchloryl fluoride gives the 22-fluoro-22-alkoxalyl-derivative. The latter compound is then converted into 3-ethylenedioxy-22-fluoro-20-spirox-5-ene-21-one on treatment with an alkali metal alkoxide.

The 3-ethylenedioxy-22-bromo-20-spirox-5-ene-21-one, which has the following structure:

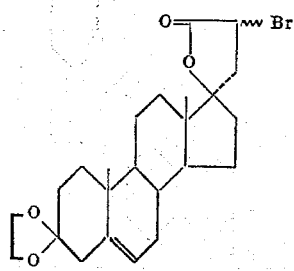

is formed by treating 3-ethylenedioxy-22-methoxalyl-20-spirox-5-ene-21-one first with bromine in the presence of an organic base such as pyridine, and then with an alkali metal alkoxide.

The 3-ethylenedioxy-22-chloro-20-spirox-5-ene-21-one, which has the following structure:

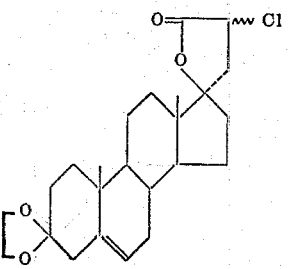

is formed by treating 3-ethylenedioxy-22-methoxalyl-20-spirox-5-ene-21-one first with chlorine in the presence of an organic base such as pyridine, and then with an alkali metal alkoxide.

The 3 - ethylenedioxy - 22-halo-20-spirox-5-ene-21-one, dissolved in a suitable solvent such as acetone, is treated with an acid catalyst, for example, p-toluene-sulfonic acid, to give 22-halo-20-spirox-4-ene-3,21-dione, which has the following structure:

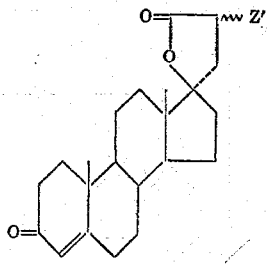

wherein Z′ stands for a halogen atom.

The 22-halo-20-spirox-4-ene-3,21-dione is converted to 22-fluoro-20-spirox-1,4-diene-3,21-dione by dehydrogenation with selenium dioxide.

Heating 22-halo-20-spirox-4-ene-3,21-dione with chloranil in a solvent such as t-butanol, gives 22-halo-20-spirox-4,6-diene-3,21-dione which when heated with a lower thioalkanoic acid gives:

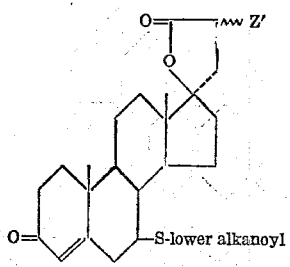

wherein Z′ stands for a halogen atom.

The latter reaction proceeds fairly rapidly at elevated temperatures, such as those in excess of 50° C. and can be carried out optionally under the influence of ultraviolet light. In carrying out the addition reaction with lower boiling thioalkanoic acids, such as thioacetic acid, it is convenient to conduct the reaction at the reflux temperature of the reaction mixture; whereas with higher boiling thioalkanoic acids it is convenient to conduct the reaction at a temperature of about 90–100° C. Heating periods of up to a few hours are sufficient to achieve substantial conversion to the desired reaction products. Typically, the desired compound is obtained in a satisfactory state of purity by direct filtration of the cooled reaction mixture, preceded, where necessary by removal of excess thioalkanoic acid. If desired, however, the reaction product can be purified by chromatography using adsorbents such as silica gel or acid-washed alumina, followed by elution with mixtures of ethyl acetate in benzene.

The addition of thioalkanoic acids to the 6,7-double bond of the starting materials employed in the practice of this invention proceeds under steric influences such that of the stereoisomers formed, one is obtained in predominant amount, which in each case, has been characterized herein as possessing the α-configuration of the 7-acylthio-group. However, the designated configuration of the 7-acylthio group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

In accordance with this invention, but starting with the 20-spirox-4-ene-11β-ol-3,21-dione instead of 20-spirox-4-ene-3,21-dione, and following the above described procedures, there is obtained as end products having useful therapeutic properties as aldosterone inhibitors the 22-halo-20-spirox-4-ene-11β-ol-3,21-dione, 22-halo-20-spirox-1,4-diene-11β-ol-3,21-dione, and 7α-lower alkanoylthio-22 - halo - 20 - spirox-4-ene-11β-ol-3,21-dione. The latter compounds may be converted to the 22-halo-20-spirox-4-ene-3,11,21-trione, 22-halo-20-spirox-1,4-diene-3,11,21-trione, and 7α-lower alkanoylthio-22-halo-20-spirox-4-ene-3,11,21-trione respectively on oxidation with chromic acid.

The 2α-methyl-22-fluoro-20-spirox-4-ene-3,21-dione is prepared from 22-fluoro-20-spirox-4-ene-3,21-dione by reaction of the latter compound with an alkyl oxalate and sodium alkoxide to form the sodium enolate of the 2-alkoxyoxalyl-derivative, which when methylated with methyl iodide, followed by removal of the alkoxyoxalyl group, using sodium alkoxide, gives 2α-methyl-22-fluoro-20-spirox-4-ene-3,21-dione.

The 2α-methyl-22-fluoro-20-spirox-4-ene-3,21-dione is converted into the 2-methyl-22-fluoro-20-spirox-1,4-diene-3,1-dione by dehydrogenation with selenium dioxide.

The 2α-methyl-22-fluoro-20-spirox-4-ene-3,21-dione is converted into the 7α-acetylthio-2α-methyl-22-fluoro-20-spirox-4-ene-3,21-dione by first heating with chloranil in a solvent such as t-butanol to give 2α-methyl-22-fluoro-20-spirox-4,6-diene-3,21-dione, and then reacting the latter compound with thioacetic acid to produce 7α-acetylthio-2α-methyl-22-fluoro-20-spirox-4-ene-3,21-dione.

The novel 9α,22-difluoro-20-spirox-4-ene-11β-ol-3,21-dione is prepared from the 20-spirox-4,9(11)-3,21-dione by the following steps:

The 20-spirox-4,9(11)-3,21-dione is reacted with butanone dioxolane and p-toluenesulfonic acid monohydrate to give 3 - ethylenedioxy-20-spirox-5,9(11)-diene-21-one. The latter compound is converted into the 3-ethylenedioxy-22-methoxalyl-20-spirox-5,9(11)-diene-21-one upon treatment with sodium hydride and dimethyl oxalate.

The 3-ethylenedioxy-22-fluoro-20-spirox-5,9(11)-diene-21-one is prepared by contacting 3-ethylenedioxy-22-methoxalyl-20-spirox-5,9(11)-diene-21-one with sodium ethoxide to form the enolate which on reaction with perchloryl fluoride, gives a product which on subsequent treatment with sodium ethoxide forms 22-fluoro-20-spirox-4,9(11)-diene-3,21-dione. The latter compound is treated with N-bromosuccinimide to give 9α-bromo-22-fluoro-20-spirox-4-ene-11β-ol-3,21-dione, which on heating with potassium acetate in absolute ethanol forms 22-fluoro-20-spirox-4-ene-3,21-dione-9,11β-oxide. The latter compound is then reacted with anhydrous hydrogen fluoride to afford 9α,22-difluoro-20-spirox-4-ene-11β-ol-3,21-dione.

The 9α,22-difluoro-20-spirox-4-ene-11β-ol-3,21-dione is converted into 20-spirox-9α,22-difluoro-1,4-diene-11β-ol-3,21-dione by dehydrogenation with selenium dioxide.

The 7α-acetylthio-9α,22-difluoro-20-spirox-4-ene-11β-ol-3,21-dione is prepared from 9α,22-difluoro-20-spirox-4-ene-11β-ol-3,21-dione by heating the latter compound with chloranil to give 9α,22-difluoro-20-spirox-4,6-diene-11β-ol-3,21-dione, which is then reacted with thioacetic acid to produce 7α-acetylthio-9α,22-difluoro-20-spirox-4-ene-11β-ol-3,21-dione.

The 9α,22-difluoro-20-spirox-4-ene-11β-ol-3,21-dione, 7α-acetylthio-9α,22-difluoro-20-spirox-4-ene-11β-ol-3,21-dione and 20-spirox-9α,22-difluoro-1,4-diene-11β-ol-3,21-dione are oxidized with chromic acid in pyridine to give the corresponding 11-keto-steroid.

The 2α-methyl-9α,22-difluoro-20-spirox-4-ene-11β-ol-3,21-dione is prepared from 22-fluoro-20-spirox-4-ene-3,21-dione-9,11β-oxide by reaction of the latter compound with an alkyl oxalate and sodium alkoxide to form the sodium enolate of the 2-alkoxyoxalyl derivative, which when methylated with methyl iodide, followed by removal of the alkoxyoxalyl group using a sodium alkoxide, gives the 2α-methyl-22-fluoro-20-spirox-4-ene-3,21-dione, 9,11β-oxide. The latter compound is then reacted with anhydrous hydrogen fluoride to form the 2α-methyl-9α,22-difluoro-20-spirox-4-ene-11β-ol-3,21-dione.

The 7α-acetylthio-2α-methyl-9α,22-difluoro-20-spirox-4-ene-11β-ol-3,21-dione is prepared from 2α-methyl-9α,22-difluoro-20-spirox-4-ene-11β-ol-3,21-dione by heating the latter compound with chloranil to give 2α-methyl-9α,22-difluoro-20-spirox-4,6-diene-11β-ol-3,21-dione which is then reacted with thioacetic acid to produce 7α-acetylthio-2α-methyl-9α,22-difluoro-20-spirox-4-ene-11β-ol-3,21-dione.

The 2α-methyl-9α,22-difluoro-20-spirox-4-ene-11β-ol-3,21-dione is converted into 2-methyl-9α,22-difluoro-20-spirox-1,4-diene-11β-ol-3,21-dione by dehydrogenation with selenium dioxide.

The 2α-methyl-9α,22-difluoro-20-spirox-4-ene-11β-ol-3,21-dione, 7α-acetylthio-2α-methyl-9α,22-difluoro-20-spirox-4-ene-11β-ol-3,21-dione and 2-methyl-9α,22-difluoro-20-spirox-1,4-diene-11β-ol-3,21-dione are oxidized with chromic acid in pyridine to give the corresponding 11-keto-steroid.

A further embodiment of our invention comprises novel pharmaceutical compositions containing these 22-halo-20-spirox-4-ene-3,21-diones exemplified in the foregoing structures. A preferred embodiment of our invention comprises pharmaceutical compositions containing these 22-halo-20-spirox-4-ene-3,21-dione compounds combined with diuretics such as chlorothiazide, hydrochlorothiazide, and related compounds.

The following examples illustrate methods of carrying out the present invention but it is to be understood that these examples are given for purposes of illustration and not of limitation.

Example 1

A mixture of 1.850 g. of 20-spirox-4-ene-3,21-dione, 100 cc. of butanone dioxolane (distilled from lithium aluminum hydride) and 60 mg. of p-toluenesulfonic acid monohydrate is distilled for 4¾ hours through a Vigreux column. The residue is partitioned between 5% aqueous sodium bicarbonate and benzene. The organic layer is washed with water and dried, and the solvent is removed in vacuo. The residue is chromatographed over 50 gms. of acid-washed alumina and eluted with mixtures of ether and chloroform to give 3-ethylenedioxy-20-spirox-5-ene-21-one, which has the following structure:

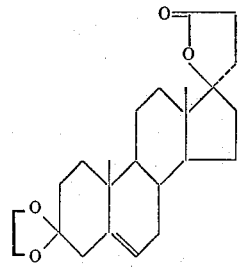

Example 2

Dimethyl oxalate (3.5 grams) is dissolved in 30 cc. of benzene. The solution is then azeotropically dried to a volume of 25 cc. Sodium hydride (1.050 g.), as a 52.7% dispersion in oil, is added. A slight reaction occurs. To this grey suspension is added 687 mg. of 3-ethylenedioxy-20-spirox-5-ene-21-one. The reaction mixture is held at 40° C. overnight with magnetic stirring. It is then diluted with an equal volume of ether and centrifuged. The precipitate is washed three times with an equal volume of ether. The sodium enolate is then covered with about 10 cc. of benzene and a saturated solution of sodium dihydrogen phosphate (pH 4) is added as quickly as possible. The separated aqueous layer is extracted two more times with ether. The combined organic layers are dried and concentrated in vacuo. The product is recrystallized several times from a mixture of ether and petroleum ether to give 3-ethylene-dioxy-22-[methoxalyl]-20-spirox-5-ene-21-one, which has the following structure:

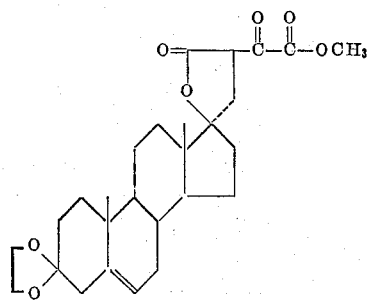

Example 3

A solution of 100 mg. of 3-ethylenedioxy-22-[methoxalyl]-20-spirox-5-ene-21-one, dissolved in 6 cc. of pyridine, is cooled to 0° C. Sodium ethoxide (26 cc. of 1 M sodium ethoxide in ethanol) is then added and the resultant solution is flushed with nitrogen for about 2 minutes. With operations conducted behind a shield, perchloryl fluoride is then bubbled into the reaction mixture for 15 minutes at 0° C. and the system is again flushed with nitrogen for about two minutes. The mixture is then poured into water and extracted with ether. The combined ether layers are washed with water, and dried, and the solvent evaporated at room temperature using a rotary evaporator. Final traces of solvent are removed under vacuum.

The residue is dissolved in 4 cc. of absolute ethanol, and 1 cc. of 1 M sodium ethoxide in ethanol is added. The solution is then allowed to stand at room temperature for 2 hours. A precipitate forms. The reaction mixture is carefully acidified, maintaining the temperature at 0° C. and then poured into water. The mixture is extracted with ether and the ether extract is dried and concentrated in vacuo to give a residue of the crude 3-ethylenedioxy-22-fluoro-20-spirox-5-ene-21-one, which is suitable for the next step of the synthesis without further purification.

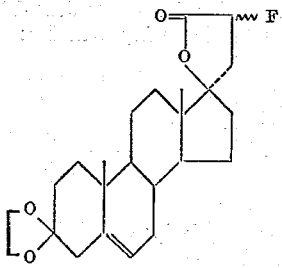

*Example 4*

Seventy-three milligrams of 3-ethylenedioxy-22-fluoro-20-spirox-5-ene-21-one is dissolved in 4 cc. of acetone and 5 mg. of p-toluenesulfonic acid monohydrate in 1 cc. of acetone is added. The solution is allowed to stand overnight at room temperature. It is then diluted with water and extracted three times with ether. The combined ether extracts are washed with water, dried and concentrated in vacuo. The residue is chromatographed over acid-washed alumina and eluted with mixtures of chloroform and ether. Recrystallization from a mixture of methylene chloride and ether affords the substantially pure 22-fluoro-20-spirox-4-ene-3,21-dione, M.P. 158–162° C., $\alpha_D^{CHCl_3}=53.2$, which has the following structure:

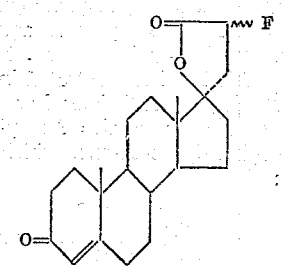

*Example 5*

A suspension of 22-fluoro-20-spirox-4-ene-3,21-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed with 10% aqueous sodium bisulfite solution and then with 5% potassium hydroxide followed by water. The solution is dried over sodium sulfate and concentrated under reduced pressure to give 22-fluoro-20-spirox-4,6-diene-3,21-dione, which has the following structure:

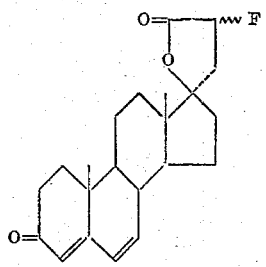

*Example 6*

A solution of 80 mg. of 22-fluoro-20-spirox-4,6-diene-3,21-dione in 1.0 ml. of thioacetic acid is heated under reflux on a steam bath for a period of ½ hour. Trituration with ether affords crystals which, after two recrystallizations from a mixture of acetone and hexane, gives 5.0 mg. of pure 7α-acetylthio-22-fluoro-20-spirox-4-ene-3,21-dione, which has the following formula:

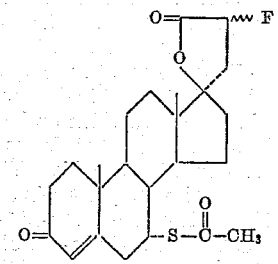

*Example 7*

To 8.0 g. of 22-fluoro-20-spirox-4-ene-3,21-dione suspended in 100 ml. of t-butyl alcohol is added 3.2 g. of commercial (95%) sodium methylate. To this mixture under nitrogen is added 5 ml. of diethyl oxalate, and the mixture is then stirred under nitrogen for 6 hours. Complete solution occurs and the product precipitates within 10 minutes. Addition of ether followed by filtration gives 13 g. of the sodium enolate, which is a powder, soluble in water but insoluble in dilute acid.

A mixture of the crude sodium enolate, 13 g. of anhydrous potassium carbonate, 300 ml. of acetone and 50 ml. of methyl iodide is refluxed for 20 hours, filtered while hot and the filtrate concentrated to a small volume. A large amount of water is added to the concentrate which is then extracted with ethyl acetate. The extract is washed with saturated sodium chloride solution, dried and treated with activated carbon. After evaporation 7.8 g. of a pale yellow residue is obtained.

To this residue, dissolved in 250 ml. of absolute alcohol, is added 1.0 g. of 95% NaOCH₃. The mixture is then allowed to stand at room temperature for 4 hours. After the addition of a few drops of acetic acid and 20 ml. of water, the methanol is removed under reduced pressure at a temperature not exceeding 35° C. The ethyl acetate extract of the mixture is washed to neutrality with a saline solution, dried, and decolorized with activated carbon. Evaporation leaves 5.7 g. of the crude 2α - methyl - 22 - fluoro - 20 - spirox - 4 - ene - 3,21-dione, which has the following structure:

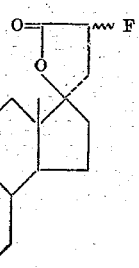

*Example 8*

To 100 mg. of 2α-methyl-22-fluoro-20-spirox-4-ene-3,21-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 2-methyl-22-fluoro-20-spirox-1,4-diene-3,21-dione, which has the following structure:

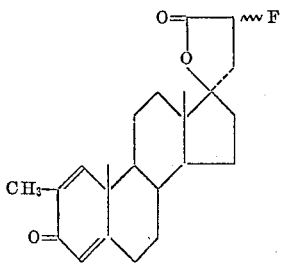

*Example 9*

A suspension of 2α-methyl-22-fluoro-20-spirox-4-ene-3,21-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed with 10% aqueous sodium bisulfite solution and then with 5% potassium hydroxide followed by water. The solution is dried over sodium sulfate and concentrated under reduced pressure to give 2α-methyl-22-fluoro-20-spirox-4,6-diene-3,21-dione, which has the following structure:

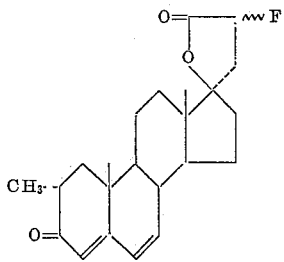

*Example 10*

A solution of 80 mg. of 2α-methyl-22-fluoro-20-spirox-4,6-diene-3,21-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-2α-methyl-22-fluoro-20-spirox-4-ene-3,21-dione, which has the following structure:

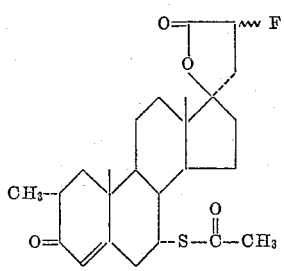

*Example 11*

A mixture of 1850 g. of 20-spirox-4,9(11)-3,21-dione, 100 cc. of butanone dioxolane (distilled from lithium aluminum hydride) and 60 mg. of p-toluene-sulfonic acid monohydrate is distilled for 4¾ hours through a Vigreux column. The residue is partitioned between 5% aqueous sodium bicarbonate and benzene. The organic layer is washed with water and dried, and the solvent is removed in vacuo. The residue is chromatographed over 50 gms. of acid-washed alumina and eluted with mixtures of ether and chloroform to give 3-ethylenedioxy-20-spirox-5,9 (11)-diene-21-one, which has the following structure:

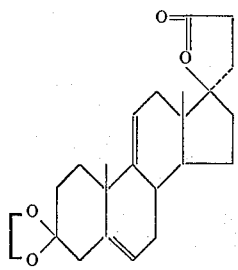

*Example 12*

Dimethyl oxalate (3.5 gms.) is dissolved in 30 cc. of benzene. The solution is then azeotropically dried to a volume of 25 cc. Sodium hydride (1.050 g.), as a 52.7% dispersion in oil, is added. A slight reaction occurs. To this grey suspension is added 687 mg. of 3-ethylenedioxy-20-spirox-5,9(11)-diene-21-one. The reaction mixture is held at 40° C. overnight with magnetic stirring. It is then diluted with an equal volume of ether and centrifuged. The precipitate is washed three times with an equal volume of ether. The sodium enolate is then covered with about 10 cc. of benzene and a saturated solution of sodium dihydrogen phosphate (pH 4) is added as quickly as possible. The separated aqueous layer is extracted two more times with ether. The combined organic layers are dried and concentrated in vacuo. The product is recrystallized several times from a mixture of ether and petroleum ether to give 3-ethylenedioxy - 22 - [methoxalyl]-20-spirox-5,9 (11)-diene-21-one, which has the following structure:

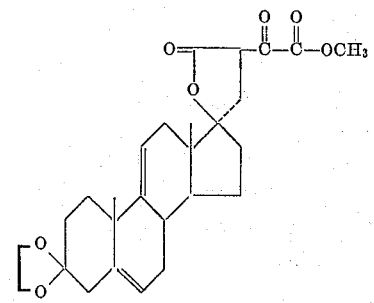

*Example 13*

A solution of 100 mg. of 3-ethylenedioxy-22-[methoxalyl]-20-spirox-5,9(11)-diene-21-one, dissolved in 6 cc. of pyridine, is cooled to 0° C. Sodium ethoxide (26 cc. of 1 M sodium ethoxide in ethanol) is then added and the resultant solution is flushed with nitrogen for about 2 minutes. With operations conducted behind a shield, perchloryl fluoride is then bubbled into the reaction mixture for 15 minutes at 0° C. and the system is again flushed with nitrogen for about two minutes. The mixture is then poured into water and extracted with ether. The combined ether layers are washed with water and dried, and the solvent evaporated at room temperature using a rotary evaporator. Final traces of solvent are removed under vacuum.

The residue is dissolved in 4 cc. of absolute ethanol, and 1 cc. of 1 M sodium ethoxide in ethanol is added. The solution is then allowed to stand at room temperature for 2 hours. A precipitate forms. The reaction mixture is carefully acidified, maintaining the temperature at 0° C., and then poured into water. The mixture is extracted with ether and the ether extract is dried and concentrated in vacuo to give a residue of the crude 3-ethylenedioxy-22-fluoro-20-spirox-5,9(11)-diene-21-one, which is suitable for the next step of the synthesis without further purification.

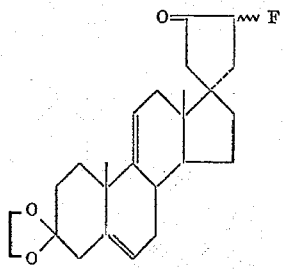

Example 14

Seventy-three milligrams of 3-ethylenedioxy-22-fluoro-20-spirox-5,9(11)-diene-21-one is dissolved in 4 cc. of acetone and 5 mg. of p-toluenesulfonic acid monohydrate in 1 cc. of acetone is added. The solution is allowed to stand overnight at room temperature. It is then diluted with water and extracted three times with ether. The combined ether extracts are washed with water, dried and concentrated in vacuo. The residue is chromatographed over acid-washed alumina and eluted with mixtures of chloroform and ether. Recrystallization from a mixture of methylene chloride and ether affords substantially pure 22-fluoro-20-spirox-4,9(11)-diene-3,21-dione, which has the following structure:

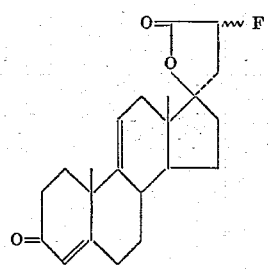

Example 15

To a mixture of 620 mg. of 22-fluoro-20-spirox-4,9(11)-diene-3,21-dione and 330 mg. of N-bromosuccinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and the product is filtered, washed with water, and dried in air to give 9α-bromo-22-fluoro-20-spirox-4-ene-11β-ol - 3,21 - dione which has the following formula:

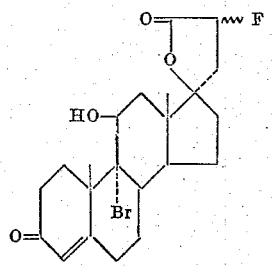

Example 16

A solution of 210 mg. of 9α-bromo-22-fluoro-20-spirox-4-ene-11β-ol-3,21-dione and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 22-fluoro-20-spirox-4-ene-3,21-dione-9,11β-oxide, which has the following structure:

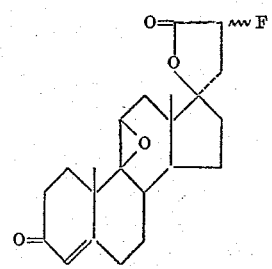

Example 17

To a solution of 200 mg. of 22-fluoro-20-spirox-4-ene-3,21-dione-9,11β-oxide in 2 ml. of chloroform and 2 ml. of tetrahydrofuran in a polyethylene bottle at —60° C. is added 2 ml. of a 2:1 (by weight) mixture of anhydrous hydrogen fluoride and tetrahydrofuran. After 4 hours at —10° C. the mixture is cooled to —60° C. and cautiously added to a stirred mixture of 30 ml. of 25% aqueous potassium carbonate and 25 ml. of chloroform kept at —5° C. The aqueous phase is further extracted with chloroform and the latter phase is washed with water and dried over magnesium sulfate. The residue on crystallization from acetone-ether gives 9α,22-difluoro-20-spirox-4-ene-11β-ol-3,21-dione, which has the following structure:

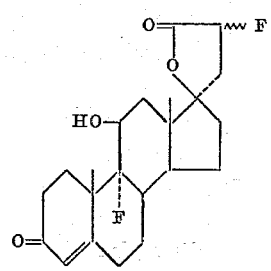

Example 18

To 100 mg. of 9α-22-difluoro-20-spirox-4-ene-11β-ol-3,21-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 20-spirox-9α,22-difluoro-1,4-diene-11β-ol-3,21-dione, which has the following structure:

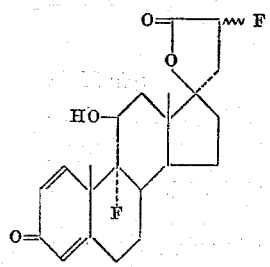

Example 19

A suspension of 9α,22-difluoro-20-spirox-4-ene-11β-ol- 3,21-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed with 10% aqueous sodium bisulfite solution and then with 5% potassium hydroxide followed by water. The solution is dried over sodium sulfate and concentrated under reduced pressure to give 9α,22-difluoro-20-spirox-4,6-diene - 11β - ol-3,21 - dione, which has the following structure:

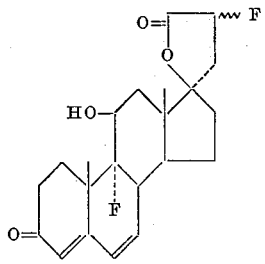

*Example 20*

A solution of 80 mg. of 9α,22-difluoro-20-spirox-4,6-diene-11β-ol-3,21-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-9α,22-difluoro-20-spirox-4-ene-11β-ol-3,21-dione, which has the following structure:

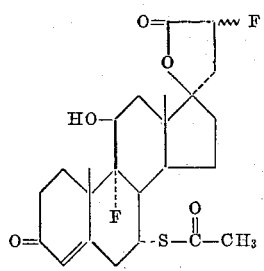

*Example 21*

To 8.0 g. of 22-fluoro-20-spirox-4-ene-3,21-dione-9,11β-oxide suspended in 100 ml. of t-butyl alcohol is added 3.2 g. of commercial (95%) sodium methylate. To this mixture under nitrogen is added 5 ml. of diethyl oxalate, and the mixture is then stirred under nitrogen for 6 hours. Complete solution occurs and the product precipitates within 10 minutes. Addition of ether followed by filtration gives 13 g. of the sodium enolate, which is a powder, soluble in water but insoluble in dilute acid.

A mixture of the crude sodium enolate, 13 g. of anhydrous potassium carbonate, 300 ml. of acetone and 50 ml. of methyl iodide is refluxed for 20 hours, filtered while hot and the filtrate concentrated to a small volume. A large amount of water is added to the concentrate which is then extracted with ethyl acetate. The extract is washed with saturated sodium chloride solution, dried and treated with activated carbon. After evaporation 7.8 g. of a pale yellow residue is obtained.

To this residue, dissolved in 250 ml. of absolute alcohol, is added 1.0 g. of 95% sodium methylate. The mixture is then allowed to stand at room temperature for 4 hours. After the addition of a few drops of acetic acid and 20 ml. of water, the methanol is removed under reduced pressure at a temperature not exceeding 35° C. The ethyl acetate extract of the mixture is washed to neutrality with a saline solution, dried, and decolorized with activated carbon. Evaporation leaves 5.7 g. of the crude 2α-methyl-22-fluoro-20-spirox-4-ene - 3,21 - dione-9,11β-oxide, which has the following structure:

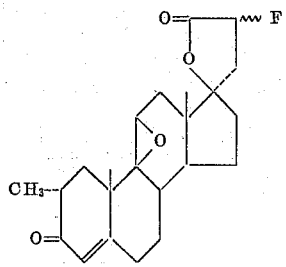

*Example 22*

To a solution of 200 mg. of 2α-methyl-22-fluoro-20-spirox-4-ene-3,21-dione-9,11β-oxide in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization from a mixture of acetone and ether gives 2α-methyl-9α,22-difluoro - 20 - spirox-4-ene-11β-ol-3,21-dione, which has the following structure:

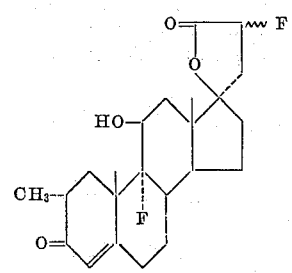

*Example 23*

To 100 mg. of 2α-methyl-9α,22-difluoro-20-spirox-4-ene-11β-ol-3,21-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 2-methyl-9α,22-difluoro-20-spirox-1,4 - diene - 11β-ol-3,21-dione, which has the following formula:

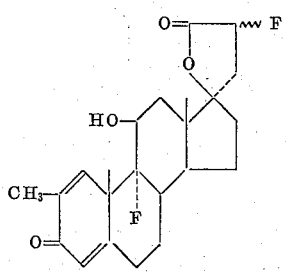

*Example 24*

A suspension of 2α-methyl-9α,22-difluoro-20-spirox-4-ene-11β-ol-3,21-dione (11.1 g.) and chloranil (24.3 g.)

in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 2α-methyl-9α,22-difluoro-20-spirox-4,6-diene-11β-ol-3,21-dione, which has the following structure:

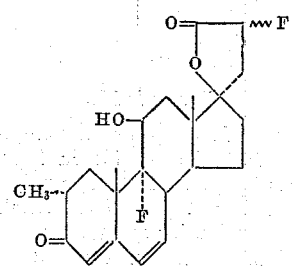

*Example 25*

A solution of 80 mg. of 2α-methyl-9α,22-difluoro-20-spirox-4,6-diene-11β-ol-3,21-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 5.0 mg. of pure 7α-acetylthio-2α-methyl - 9α,22 - difluoro - 20 - spirox - 4 - ene - 11β - ol - 3,21-dione, which has the following structure:

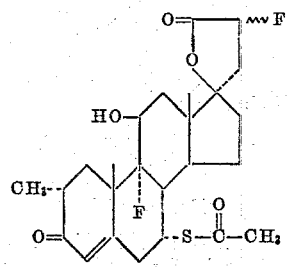

*Example 26*

A mixture of 1.5 parts by weight of 22-fluoro-20-spirox-4,6-diene-3,21-dione and 1.5 parts by volume of thiopropionic acid is heated on the steam bath for 3 hours. After standing overnight, the reaction mixture is diluted with 25 parts by volume of ether. The crystals which form on cooling are separated and recrystallized from ether and petroleum ether to obtain 7α-propionylthio-22-fluoro-20-spirox-4-ene-3,21-dione which has the following structure:

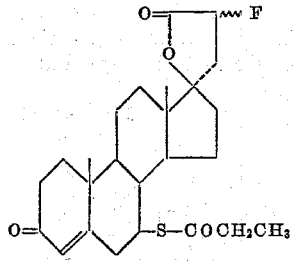

*Example 27*

A solution of 3 millimoles of 3-ethylenedioxy-22-methoxalyl-20-spirox-5-ene-21-one, and 3.05 millimoles of pyridine in 25 ml. of dry benzene is cooled to 0° C. To this solution is added slowly with stirring 3 millimoles of bromine in 25 ml. of benzene. The reacting mixture is allowed to stand for 5 minutes at room temperature and is then poured into water and ether. The organic solvent layer is washed several times with water, dried and then evaporated in vacuo at a temperature less than 35° C. The residue is taken up in 35 ml. of dry methanol cooled to 0° C. and 2 ml. of 2 N sodium methoxide in methanol is then added. The mixture is allowed to stand at room temperature for 2 hours and is then acidified with aqueous sodium dihydrogen phosphate in the cold. Most of the solvent is then removed in vacuo and the residue is extracted with ether. The ether extract is washed, dried and concentrated in vacuo to give the crude 3-ethylenedioxy-22-bromo-20-spirox-5-ene-21-one, which is suitable for the next step of the synthesis without further purification, and has the formula:

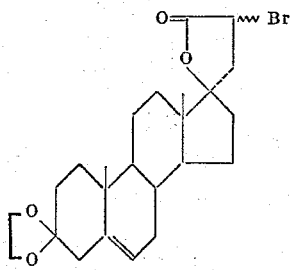

*Example 28*

A solution of 3 millimoles of 3-ethylenedioxy-22-methoxalyl-20-spirox-5-ene-21-one, and 3.05 millimoles of pyridine in 25 ml. of dry benzene is cooled to 0° C. To this solution is added slowly with stirring 3 millimoles of chlorine in 25 ml. of benzene. The reacting mixture is allowed to stand for 15 minutes at room temperature and is then poured into water and ether. The organic solvent layer is washed several times with water, dried and then evaporated in vacuo at a temperature less than 35° C. The residue is taken up in 35 ml. of dry methanol cooled to 0° C. and 2 ml. of 2 N sodium methoxide in methanol is then added. The mixture is allowed to stand at room temperature for 2 hours and is then acidified with aqueous sodium dihydrogen phosphate in the cold. Most of the solvent is then removed in vacuo and the residue is extracted with ether. The ether extract is washed, dried and concentrated in vacuo to give the crude 3-ethylenedioxy-22-chloro-20-spirox-5-ene-21-one, which is suitable for the next step of the synthesis without further purification, and has the formula:

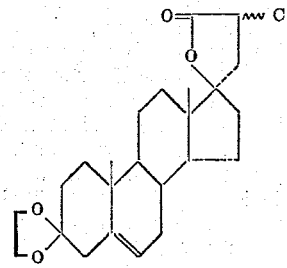

*Example 29*

Seventy-three milligrams of 3-ethylenedioxy-22-bromo-20-spirox-5-ene-21-one is dissolved in 4 cc. of acetone and 5 mg. of p-toluenesulfonic acid monohydrate in 1 cc. of acetone is added. The solution is allowed to stand overnight at room temperature. It is then diluted with water and extracted three times with ether. The combined ether extracts are washed with water, dried and concentrated in vacuo. The residue is chromatographed over acid-washed alumina and eluted with mixtures of chloroform and ether. Recrystallization from a mixture of methylene chloride and ether affords 22-bromo-20- spirox-4-ene-3,21-dione, which has the formula:

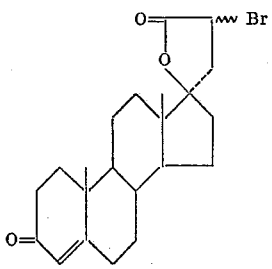

In accordance with the above procedure, but starting with 3-ethylenedioxy-22-chloro-20-spirox-5-ene-21-one in place of 3 - ethylenedioxy-22-bromo-20-spirox-5-ene-21-one, there is obtained 22-chloro-20-spirox-4-ene-3,21-dione.

*Example 30*

A suspension of 22-bromo-20-spirox-4-ene-3,21-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide and then water. The solution is dried over sodium sulfate and concentrated under reduced pressure to give 22-bromo-20-spirox-4,6-diene-3,21-dione, which has the formula:

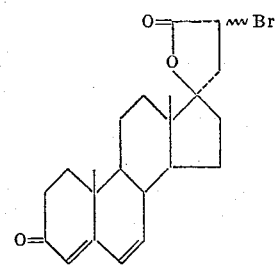

In accordance with the above procedure, but starting with 22-chloro-20-spirox-4-ene-3,21-dione in place of 22-bromo-20-spirox-4-ene-3,21-dione, there is obtained 22-chloro-20-spirox-4,6-diene-3,21-dione.

A solution of 80 mg. of 22-bromo-20-spirox-4,6-diene-3,21-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α - acetylthio-22-bromo-20-spirox-4-ene-3,21-dione, which has the following structure:

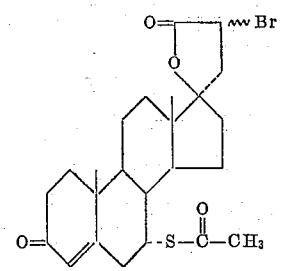

In accordance with the above procedure, but starting with 22-chloro-20-spirox4,6-diene-3,21-dione in place of 22-bromo-20-spirox-4-ene-3,21-dione there is obtained 7α-acetylthio-22-chloro-20-spirox-4-ene-3,21-dione.

*Example 31*

A mixture of 1.850 g. of 20-spirox-4-ene-11β-ol-3,21-dione, 100 cc. of butanone dioxolane (distilled from lithium aluminum hydride) and 60 mg. of p-toluene-sulfonic acid monohydrate is distilled for 4¾ hours through a Vigreux column. The residue is partitioned between 5% aqueous sodium bicarbonate and benzene. The organic solvent layer is washed with water and dried, and the solvent is removed in vacuo. The residue is chromatographed over 50 gms. of acid-washed alumina and eluted with mixtures of ether and chloroform to give 3-ethylenedioxy-20-spirox-5-ene-11β-ol-21-one, which has the following structure:

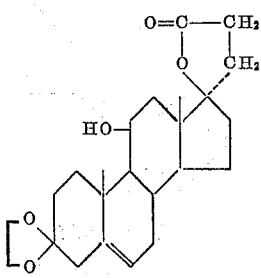

*Example 32*

Dimethyl oxalate (3.5 gms.) is dissolved in 30 cc. of benzene. The solution is then azeotropically dried to a volume of 25 cc. Sodium hydride (1.050 g.), as a 52.7% dispersion in oil, is added. A slight reaction occurs. To this grey suspension is added 687 mg. of 3-ethylenedioxy-20-spirox-5-ene-11β-ol-21-one. The reaction mixture is held at 40° C. overnight with magnetic stirring. It is then diluted with an equal volume of ether and centrifuged. The precipitate is washed three times with an equal volume of ether. The sodium enolate is then covered with about 10 cc. of benzene and a saturated solution of sodium dihydrogen phosphate (pH 4) is added as quickly as possible. The separated aqueous layer is extracted two more times with ether. The combined organic layers are dried and concentrated in vacuo. The product is recrystallized several times from a mixture of ether and petroleum ether to give 3-ethylenedioxy-22-methoxallyl-20-spirox-5-ene-11β-ol-21-one, which has the following structure:

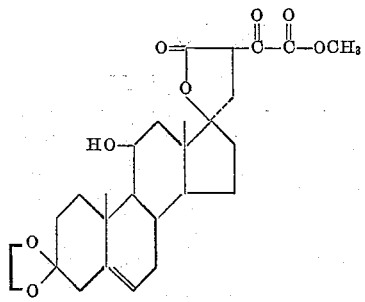

*Example 33*

A solution of 100 mg. of 3-ethylenedioxy-22-methoxalyl-20-spirox-5-ene-11β-ol-21-one, dissolved in 6 cc. of pyridine, is cooled to 0° C. Sodium ethoxide 0.26 cc. of 1 M sodium ethoxide in ethanol is then added and the resultant solution is flushed with nitrogen for about 2 minutes. With operations conducted behind a shield, perchloryl fluoride is then bubbled into the reaction mixture for 15 minutes at 0° C. and the system is again flushed with nitrogen for about two minutes. The mixture is then poured into water and extracted with ether. The combined ether layers are washed with water and dried, and the solvent evaporated at room temperature using a rotary evaporator. Final traces of solvent are removed under vacuum.

The residue is dissolved in 4 cc. of absolute ethanol, and 1 cc. of 1 M sodium ethoxide in ethanol is added. The solution is then allowed to stand at room temperature for 2 hours. A precipitate forms. The reaction mixture is carefully acidified, maintaining the temperature at 0° C., and then poured into water. The mixture is extracted with ether and the ether extract is dried and concentrated in vacuo to give a residue of the crude 3-ethylenedioxy-22-fluoro-20-spirox-5-ene-11β-ol-21-one which is suitable for the next step of the synthesis without further purification.

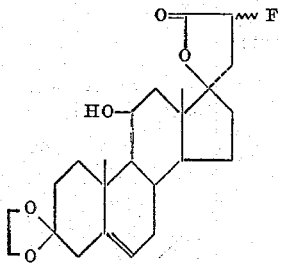

*Example 34*

Seventy-three milligrams of 3-ethylenedioxy-22-fluoro-20-spirox-5-ene-11β-ol-21-one is dissolved in 4 cc. of acetone and 5 mg. of p-toluenesulfonic acid monohydrate in 1 cc. of acetone is added. The solution is allowed to stand overnight at room temperature. It is then diluted with water and extracted three times with ether. The combined ether extracts are washed with water, dried and concentrated in vacuo. The residue is chromatographed over acid-washed alumina and eluted with mixtures of chloroform and ether. Recrystallization from a mixture of methylene chloride and ether affords 22-fluoro-20-spirox-4-ene-11β-ol-3,21-dione, which has the following structure:

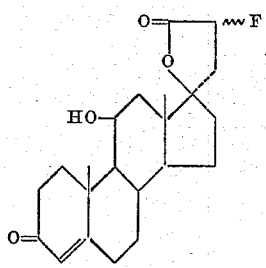

*Example 35*

A suspension of 22-fluoro-20-spirox-4-ene-11β-ol-3,21-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 22-fluoro-20-spirox-4,6-diene-11β-ol-3,21-dione, which has the following structure:

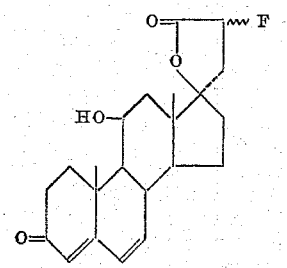

*Example 36*

A solution of 80 mg. of 22-fluoro-20-spirox-4,6-diene-11β-ol-3,21-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-22-fluoro-20-spirox-4-ene-11β-ol-3,21-dione, which has the following formula:

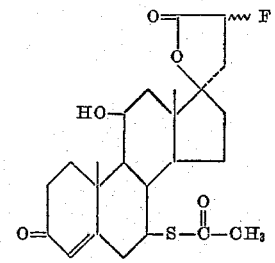

In accordance with the above procedure, but starting with 22-fluoro-20-spirox-4,6-diene-3,11,21-trione in place of the 22-fluoro-20-spirox-4,6-diene-11β-ol-3,21-one, there is obtained 7α-acetylthio-22-fluoro-20-spirox-4-ene-3,11,21-trione.

*Example 37*

To 100 mg. of 22-fluoro-20-spirox-4-ene-11β-ol-3,21-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The mixture is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 22-fluoro-20-spirox-1,4-diene-11β-ol-3,21-dione, which has the following formula:

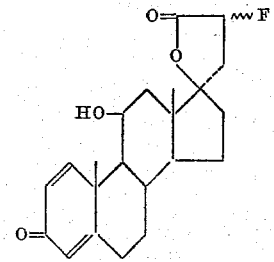

In accordance with the above procedure, but starting with 22-fluoro-20-spirox-4-ene-3,11,21-trione or 22-fluoro-20-spirox-4-ene-3,21-dione, there is obtained 22-fluoro-20-spirox-1,4-diene-3,11,21-trione or 22-fluoro-20-spirox-1,4-diene-3,21-dione respectively.

*Example 38*

A solution of 400 mg. of 22-fluoro-20-spirox-4-ene-11β-ol-3,21-dione in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 22-fluoro-20-spirox-4-ene-3,11,21-trione, which has the following structure:

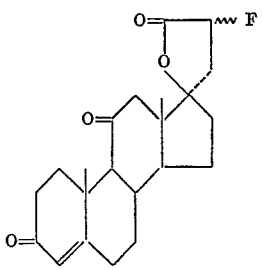

In accordance with the above procedure, but starting with the following compounds in place of 22-fluoro-20-spirox-4-ene-11β-ol-3,21-dione, there is obtained the corresponding 11-keto-steroid:

9α,22-difluoro-20-spirox-4-ene-11β-ol-3,21-dione

7α-acetylthio - 9α,22 - difluoro-20-spirox-4-ene-11β-ol-3,21-dione

9α,22-difluoro-20-spirox-1,4-diene-11β-ol-3,21-dione

2α - methyl-9α,22-difluoro-20-spirox-4-ene-11β-ol-3,21-dione

7α-acetylthio - 2α - methyl - 9α,22 - difluoro-20-spirox-11β-ol-3,21-dione 2-methyl - 9α,22 - difluoro - 20-spirox-1,4-diene-11β-ol-3,21-dione.

Various changes and modifications may be made in carrying out the present invention without departing from the spirit and scope thereof. Insofar as these changes and modifications are within the purview of the annexed claims, they are to be considered as part of our invention.

We claim:
1. 3-ethylenedioxy-20-spirox-5-ene-21-one.
2. 3-ethylenedioxy-22-halo-20-spirox-5-ene-21-one.
3. The process which comprises reacting a compound of the formula:

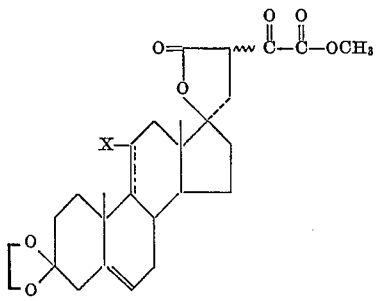

wherein the dotted line between carbon atoms 9 and 11 indicates that a double bond may be present in this position and wherein X is a member of the group consisting of hydrogen and hydroxy, sequentially with an alkali metal alkoxide, perchloryl fluoride and then an alkali metal alkoxide, to form a compound of the formula:

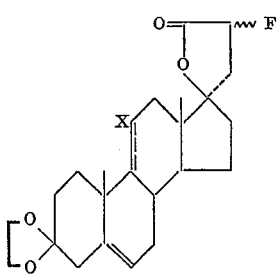

wherein X has the significance above defined.
4. The process which comprises reacting a compound of the formula:

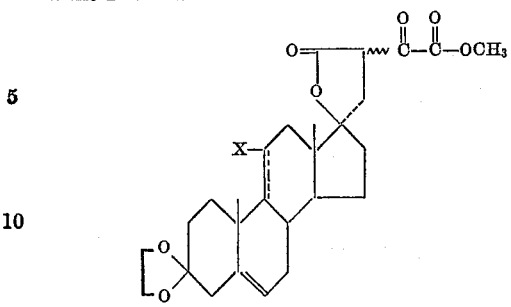

wherein the dotted line between carbon atoms 9 and 11 indicates that a double bond may be present in this position and wherein X is a member of the group consisting of hydrogen and hydroxy, sequentially with bromine in the presence of an organic base, and then with an alkali metal alkoxide to form a compound of the formula:

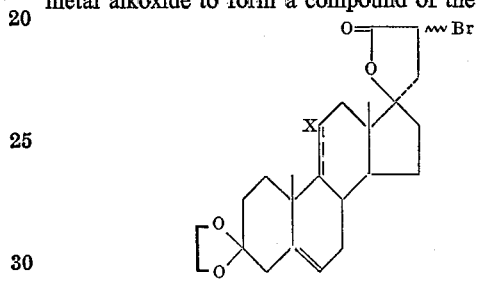

wherein X has the significance above defined.
5. The process which comprises reacting a compound of the formula:

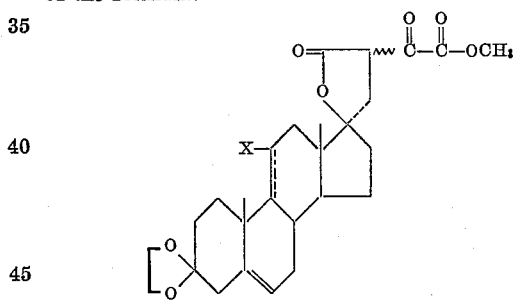

wherein the dotted line between carbon atoms 9 and 11 indicates that a double bond may be present in this position and wherein X is a member of the group consisting of hydrogen and hydroxy, sequentially with chlorine in the presence of an organic base, and then with an alkali metal alkoxide, to form a compound of the formula:

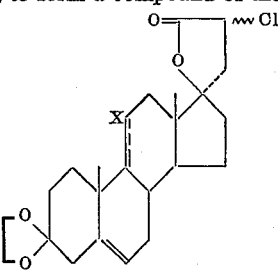

wherein X has the significance above defined.

References Cited in the file of this patent
UNITED STATES PATENTS
2,859,222     Dodson et al. _____ Nov. 4, 1958

OTHER REFERENCES
Ringold et al.: J. Org. Chem. 21, pages 239–40, 1956.
Chemical and Engineering News, September 16, 1957, pages 66–67.
Loewenthal: Tetrahedron, vol. 6, No. 4, June 1959, page 290.